United States Patent [19]

Roeder et al.

[11] Patent Number: 4,684,989
[45] Date of Patent: Aug. 4, 1987

[54] SIGNAL BACKGROUND NOISE DETECTOR

[75] Inventors: Barbara J. Roeder, Pt. Pleasant, Pa.;
Leopold A. Harwood, Bridgewater;
Hermann J. Weckenbrock,
Bordentown Township, Burlington
County, both of N.J.

[73] Assignee: RCA Corporation, Princeton, N.J.

[21] Appl. No.: 826,998

[22] Filed: Feb. 7, 1986

[51] Int. Cl.⁴ .................. H04N 5/217; H04N 5/21;
G06G 7/12
[52] U.S. Cl. ............................ 358/167; 358/36;
364/517; 364/574; 364/575; 455/63; 455/222;
455/296
[58] Field of Search ............... 358/36, 105, 167, 177,
358/336, 37, 340, 166; 307/542; 324/57 N;
343/5 PN; 364/517, 574, 575; 365/206; 371/64;
375/34, 99; 381/46, 47, 71, 94; 455/50, 63, 222,
223, 296

[56] References Cited
U.S. PATENT DOCUMENTS
4,249,210 2/1981 Storey et al. ............... 358/167
4,607,278 8/1986 Flamm ...................... 358/167

FOREIGN PATENT DOCUMENTS
2102651 2/1983 United Kingdom.

Primary Examiner—James J. Groody
Assistant Examiner—Michael D. Parker
Attorney, Agent, or Firm—E. M. Whitacre; P. J.
Rasmussen; E. P. Herrmann

[57] ABSTRACT

Apparatus for estimating noise in an electrical signal having substantially redundant recurring intervals includes circuitry for producing difference samples corresponding to signal differences between the recurring redundant intervals. A number of difference samples are averaged, and ones of the difference samples contributing to each average are subtracted from the averages. Magnitude values are extracted from the differences between the averages and the difference samples. A predetermined number of the magnitude values are averaged to produce a noise estimate signal.

9 Claims, 5 Drawing Figures

SIGNAL BACKGROUND NOISE DETECTOR

This invention relates to apparatus for estimating the magnitude of electrical noise in signals having redundant intervals.

BACKGROUND OF THE INVENTION

The invention will be described in terms of video signal processing though it is to be understood to be applicable to other signal processing environments wherein the signal to be processed contains repeating or redundant information.

Numerous video signal processing systems are designed to vary functionally in accordance with the signal-to-noise ratio (SNR) of the signal being processed. Examples of such systems are programmable bandwidth chrominance filters, horizontal peaking circuits and noise reducing recursive filters, to name a few. These systems typically have some parameter controlled by a signal corresponding to the noise level in the processed signal.

Designing a relatively accurate noise measuring apparatus to control such systems for use in consumer instruments such as a television receiver is a difficult undertaking. First and foremost it is not possible to discriminate between noise and actual signal in the average real time video signal. Second, since noise is random, the noise measurement should be the root-mean square of the noise. While algorithms are known for making root-mean-square noise measurements, the apparatus required to perform such algorithms are generally prohibitively complex or expensive for use in consumer products. Because of these difficulties, video system designers resort to estimating noise values.

The more common method of making noise estimates for video signals is to determine the average AC amplitude of portions of the video signal that do not contain video information such as the vertical blanking interval. The presumption is made that any AC variations in these portions of the signal arise from noise. The average amplitude values from respective measurements are integrated over time to produce more accurate results.

The noise measurements tend to be relatively static even if the integration time is short, e.g. several frame periods. Since noise often occurs in short bursts, which may encompass e.g. twenty five percent of the reproduced image, noise adaptive processing systems controlled by these static measurements cannot react to the noise bursts. In addition, the noise attendant portions of the video signal which do not contain video information may not be representative of the noise contained within the video information. This situation may occur where the source of the video signal is a storage medium which only stores active video and reconstructs the nonactive signal portions such as the vertical and horizontal blanking intervals.

Storey et al. in U.S. Pat. No. 4,249,210 disclose a method for measuring noise values from the active portions of video signals. The apparatus of the Storey et al. disclosure forms the differences of corresponding pixels from successive frames. If there is no interimage motion, the pixel differences contain only noise information. If there is interimage motion, the pixel differences contain both motion and noise information. In the Storey et al. system the presumption is made that the pixel differences having the smallest magnitude contain only noise information. Noise is discriminated from motion by selecting the smallest pixel difference values from each horizontal line of pixel differences and averaging these smallest pixel differences over a frame period. The averaged difference value is used as a noise estimate for the succeeding frame interval.

The Storey et al. noise measuring apparatus at least for stationary images will tend to produce a noise estimate value smaller than the actual average noise value. Secondly, while this system updates the noise estimate every frame period, it is not sufficiently dynamic to respond to a burst of noise within an image.

Ito et al. in the laid open UK Patent Application GB No. 2 102 651 A disclose a system wherein interimage pixel differences are squared and then averaged over an approximate frame period. Pixel differences with amplitudes greater than a predetermined threshold value are not included in the averages on the assumption that these differences include motion information. The accuracy of this noise measuring system depends on the selection of the predetermined threshold value. In actuality this value should be different for differing image contrast. The noise estimates provided by this system are not sufficiently dynamic to respond to short noise bursts.

It is an object of the present invention to determine relatively accurate noise estimates from active video signals representing a relatively small percentage of the reproduced image. It is a further object of the invention to provide noise estimates responsive to noise bursts, occurring in localized image portions.

SUMMARY OF THE INVENTION

The noise estimating apparatus of the present invention includes a delay element for providing delayed replicas of signal and a subtracter for producing sample differences of current signal and the delayed replicas. Sample combining circuitry coupled to the subtracter, sums and averages a plurality of the difference samples. The averages and selected ones of the difference samples contributing to the averages are coupled to further subtracting circuitry which subtracts each of the ones of the difference samples from the corresponding averages. The differences produced by the subtracting circuitry are averaged to produce a noise estimate.

DETAILED DESCRIPTION

In the different figures, elements designated with like numerals perform like functions. The signal to be processed for noise detection will be presumed to be sampled data signals and where necessary the processing elements are clocked synchronously with the sample rate. The signal may be either in analog or digital form, thus, the circuit elements are represented in functional terms. Each of the functional elements are conventional elements and are available in both analog and digital form, and thus, will not be described in detail. Depending upon the choice of functional elements selected for implementing the illustrative circuitry described, compensating delays may be required between certain processing elements to maintain desired temporal alignment of signals in various signal paths. One skilled in the art of circuit design will readily comprehend and provide such compensating delays.

Figure 1:
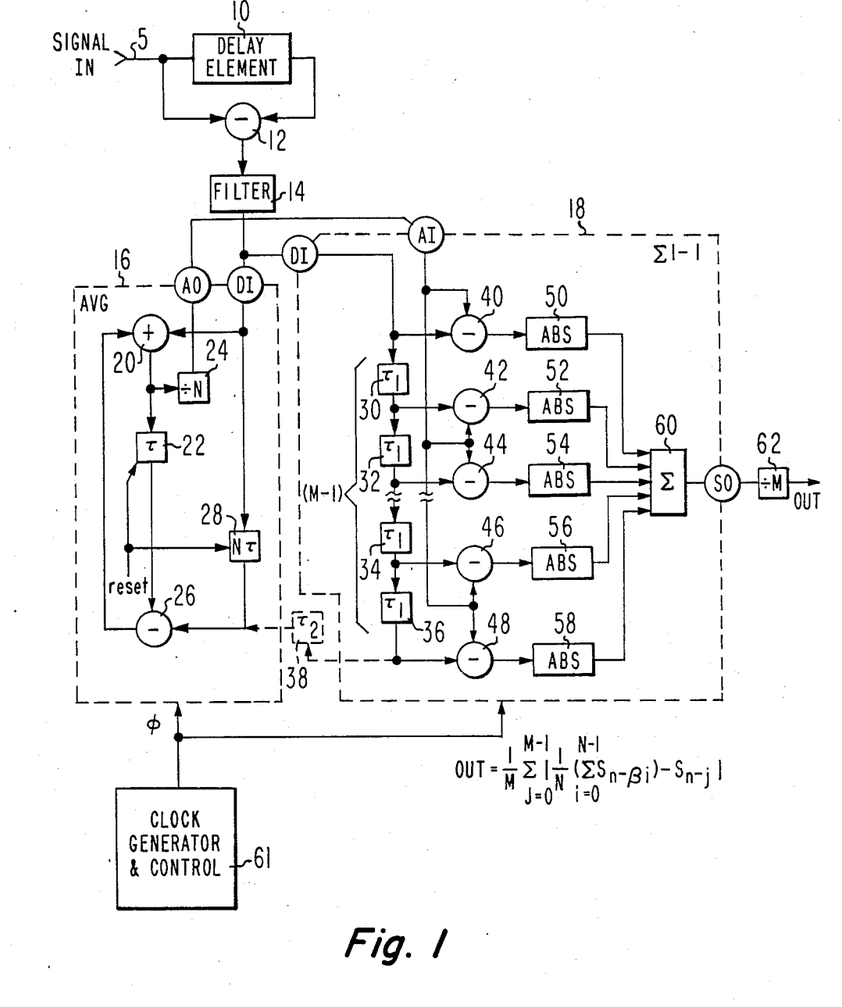
FIGS. 1 and 3 are partial block and partial schematic diagrams of two noise estimating circuits embodying the present invention, which circuits develop noise estimates from one dimensional arrays of signal differences.

Referring to FIG. 1, there is illustrated a noise estimator which develops a noise estimate from signal differences between substantially redundant portions of an input signal. In the figure, input signal is applied to terminal 5 from which it is coupled to the input connection of a delay element 10 and one input connection of a subtracter 12. The output connection of the delay element 10 is coupled to a second input connection of subtracter 12. Subtracter 12 produces the differences between the input signal and delayed signal from delay element 10.

The period of signal delay provided by delay element 10 is selected to conform to periods of repetition or redundancy of the input signal. If the input signal is a video signal, such as composite video signal or one of its video components, substantial signal redundancy occurs at horizontal line intervals, and field intervals, and integral multiples of horizontal line and field intervals. Thus, delay element 10 may be e.g. a one or two line delay element, or a one or two field delay element etc. The percentage redundancy is greatest (at least for nonmoving images) over a frame interval (two fields of NTSC video signal) and thus a frame delay element is preferred.

For one hundred percent signal redundancy, the difference samples provided by subtracter 12 consist entirely of noise contributions. The percentage of interframe signal redundancy decreases with interframe image object motion. When interframe image motion occurs, the difference samples provided by subtracter 12 consist of both noise contributions and image motion information. Noise estimates are made by determining the average of difference samples over an interval of time and then determining the average magnitude of differences between the average difference samples and selected ones of the particular difference samples. Motion contributions to the difference samples tend to be correlated over the intervals that the averages are taken and tend to cancel out of the noise estimates. Noise contributions are generally not correlated, and their contributions to magnitude differences sum constructively. Transitions between correlated motion contributions tend to adversely influence the noise estimates. The influence of these transitions may be minimized by additional circuitry discussed below with reference to FIG. 5.

Referring again to FIG. 1, the signal difference samples provided by subtracter 12 are coupled to a filter 14. If the input signal is a composite video signal, and the subcarrier of the current and delayed chrominance component are antiphase, the signal differences produced by subtracter 12 will include a chrominance component of twice the original amplitude. Filter 14 is designed to eliminate the chrominance component from the difference samples and may be a notch filter which attenuates signal centered at the chrominance subcarrier frequency or it may be a low-pass filter which attenuates signal frequencies normally occupied by the entire chrominance band of frequencies. Even if the delayed and current chrominance subcarrier are in phase, however, it may still be desirable to include a filter 14 which attenuates the chrominance components of the signal.

If the input signal consists solely of the luminance component of video signal, filter 14 may be excluded. Similarly, if the input signal consists solely of the chrominance component of video signal, and the delayed and current signals have like subcarrier phase, filter 14 may be excluded. Note that if the input signal consists solely of the chrominance component and the current and delayed signals have opposite subcarrier phase, an adder will be substituted for subtracter 12 and filter 14 may again be excluded.

The difference samples passed by filter 14 are coupled to an averaging circuit 16 which produces the average of N samples occurring across an interval $(N-1)\tau$. The period $\tau$ is an integral number, which may include one, of sample periods. Thus, averager 16 may be constructed to average N successive difference samples or N samples selected from e.g. every second or third sample over the interval of $N\tau$ sample periods. Values for the number N will desirably be greater than four.

The difference samples are coupled to one input connection of adder 20 and to the input connection of delay element 28. Delay element 28 provides a delay of $N\tau$ sample periods, the output of which is coupled to the subtrahend input connection of subtracter 26. The output of subtracter 26 is coupled to the second input connection of adder 20. The output signal produced by adder 20 corresponds to the sum of N sample differences and is coupled to the input connection of delay element 22. Delay element 22 delays the sum samples by $\tau$ sample periods and the delayed sum samples are coupled to the minuend input connection of subtracter 26.

The output samples, $S_A$, provided by adder 20 may be expressed by the equation $$S_A = S_n + \left( \sum_{i=1}^{N} S_{n-\beta i} - S_{n-\beta N} \right) \quad (1)$$

where the index n refers to the current sample and the index factor $\beta$ is equal to the integral number of sample periods included in the delay period $\tau$. The first term, $S_n$, on the right hand side of the equation is the contribution applied from the filter 14 to adder 20. The term in parenthesis is the contribution applied from subtracter 26 to adder 20. Equation (1) may be reduced to $$S_A = \sum_{i=0}^{N-1} S_{n-\beta i} \quad (2)$$

which indicates that each sample sum $S_A$ is equal to the sum of the current difference sample and $N-1$ preceding difference samples.

The sample sums, $S_A$ from adder 20, are coupled to a divider or scaling circuit 24 which divides the sums by N and outputs the sample averages on terminal A0.

Depending on the length of the interval over which the sample differences are averaged it may be desirable to exclude certain portions of the signal differences from the averages. An example may include portions of the horizontal blanking intervals which may include non-repetitive auxilliary digital information. In this instance, the delay elements 22 and 28 may be set to zero by action of a reset pulse which may be developed from horizontal synchronization signals. Alternatively, since the system is a clocked system, the clock may be inhibited during such intervals. In FIG. 1, clock signals are generated in a clock generator 61 and shown coupled to the averager 16. In averager 16 the delay elements will typically be clocked synchronously with the input sample rate. The remaining circuit elements in averager 16 may or may not be clocked depending on the designer's choice of circuit elements to perform the indicated functions.

The difference sample averages from divider 24 and the difference samples from filter 14 are coupled to circuitry 18 which produces sums of the magnitude values of the differences of the difference sample averages and ones of the difference samples contributing to the difference sample averages. The difference samples are coupled to a cascade connection of (M−1) delay elements 30-36. The delay elements 30-36 respectively delay the difference samples by a period $\tau 1$ which is equal to an integral number (including one) of sample periods and may be equal to the delay period $\tau$. The number (M−1) is preferably less than N because a number (M−1) greater than N will adversely affect the cancellation of motion contributions to the noise estimates.

The difference samples from filter 14 and from the respective delay elements 30-36 are coupled to respective first input connections of subtracters 40-48. The difference sample averages from divider 24 are coupled to respective second input connections of subtracters 40-48. Each of the subtracters produce an output corresponding to the difference between the difference sample average and a difference sample contributing to the average. The respective differences produced by subtracters 40-48 are coupled to absolute value circuits 50-58 respectively which produce the magnitude values of the respective differences applied thereto. The respective magnitude values are coupled to the combining circuit 60 which produces on connection S0 the sums of the magnitude values. The magnitude value sums are coupled to the divider or scaling circuit 62 which divides the sums by the value M to produce the average magnitude value. The average magnitude value corresponds to the desired noise estimate. The noise estimate $S_{out}$ may be expressed by the equation $$S_{out} = \frac{1}{M} \sum_{j=0}^{M-1} \left| \frac{1}{N} \left( \sum_{i=0}^{N-1} S_{n-\beta i} \right) - S_{n-j} \right|. \quad (3)$$

Note that in a practical implementation, delay element 28 may be eliminated and the delayed difference samples may be supplied to subtracter 26 through delay elements 30-36 coupled via delay element 38 shown in phantom lines. Delay element 38 provides a delay $\tau 2$ which compensates for the difference in delay provided by delay element 28 and the cascade connection of delay elements 30-36.

Figure 2:
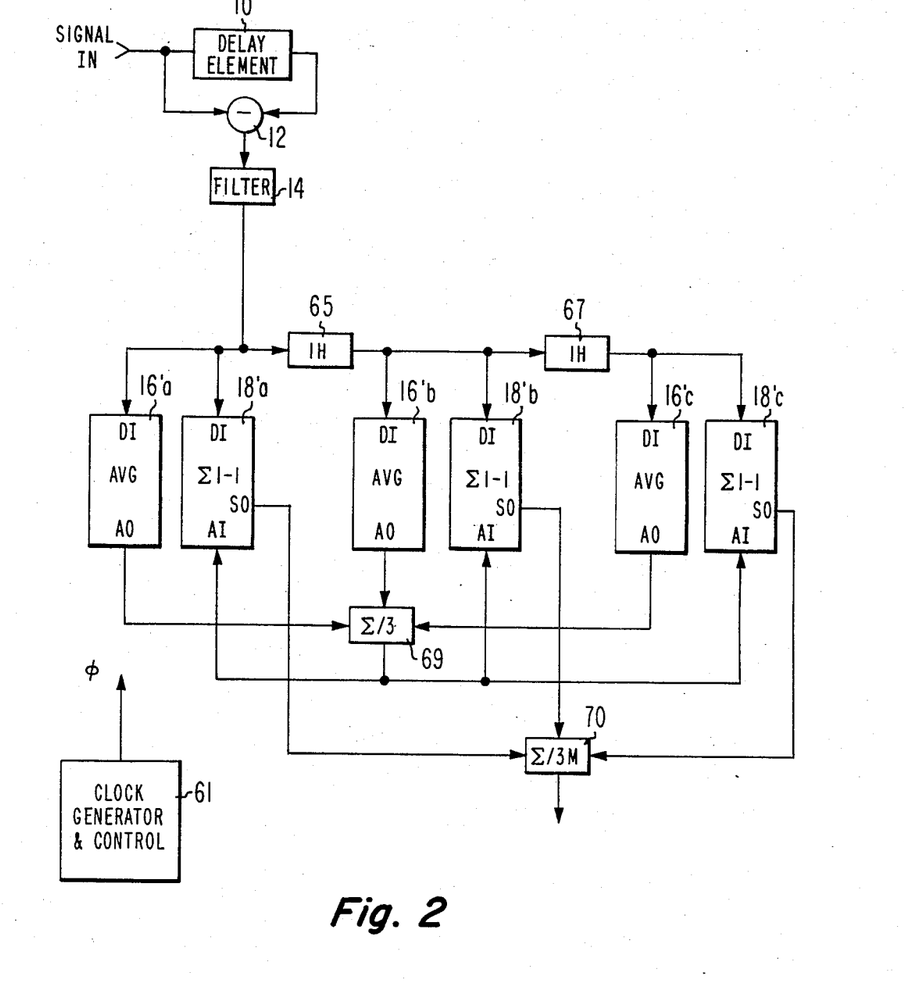
FIGS. 2 and 4 are block diagrams of noise estimating circuitry embodying the present invention, which circuits develop noise estimates from two dimensional arrays of signal differences.

The noise estimator of FIG. 1 operates on samples from a one dimensional array of sample differences. In a video signal processing environment this one dimensional array corresponds to difference samples occurring along a single horizontal line. The estimator may be expanded to operate on a two dimensional array of difference samples from a plurality of horizontal lines as shown in FIG. 2. In FIG. 2 each of the circuit elements 16a', 16b' and 16c' correspond to the averager 16 in FIG. 1 and each of the circuit elements 18a', 18b' and 18c' correspond to the average differencing element 18 in FIG. 1.

The difference samples from filter 14 are coupled to the input connection of averager 16a' and to the input connection of the cascade connected one-horizontal-line delay elements 65 and 67. Delayed difference samples from delay elements 65 and 67 are coupled to the input connections of averagers 16b' and 16c' respectively. The difference samples applied to averagers 16a', 16b' and 16c' are thus derived from corresponding signal differences from three successive horizontal image lines. Averagers 16a', 16b' and 16c' develop respective difference sample averages from the respective horizontal lines of difference samples. These averages are applied to circuit element 69 which sums the three averages and divides the sums by three to develop a spatial difference sample average. The spatial difference sample average is coupled to the sample average input connections, AI, of average differencing elements 18a', 18b' and 18c'.

The difference samples from filter 14 and the delayed difference samples from delay elements 65 and 67 are coupled to the difference sample input connections, DI, of the average differencing elements 18a', 18b' and 18c' respectively. Average differencing elements 18a', 18b' and 18c' form the sums of the magnitude values of the differences between the spatial average and selected difference samples (M in number) from their corresponding horizontal lines. The magnitude value sums from the average differencing elements 18a', 18b' and 18c' are coupled to circuit element 70 which adds the three sums and divides the result by 3M to produce the noise estimate.

An alternative arrangement (not shown) to securing a spatial noise estimate includes applying the noise estimate from the FIG. 1 apparatus to the cascade connection of two one-horizontal-line delay elements and averaging the estimates provided by the FIG. 1 apparatus with the delayed noise estimates from the two one-horizontal-line delay elements.

Figure 3:
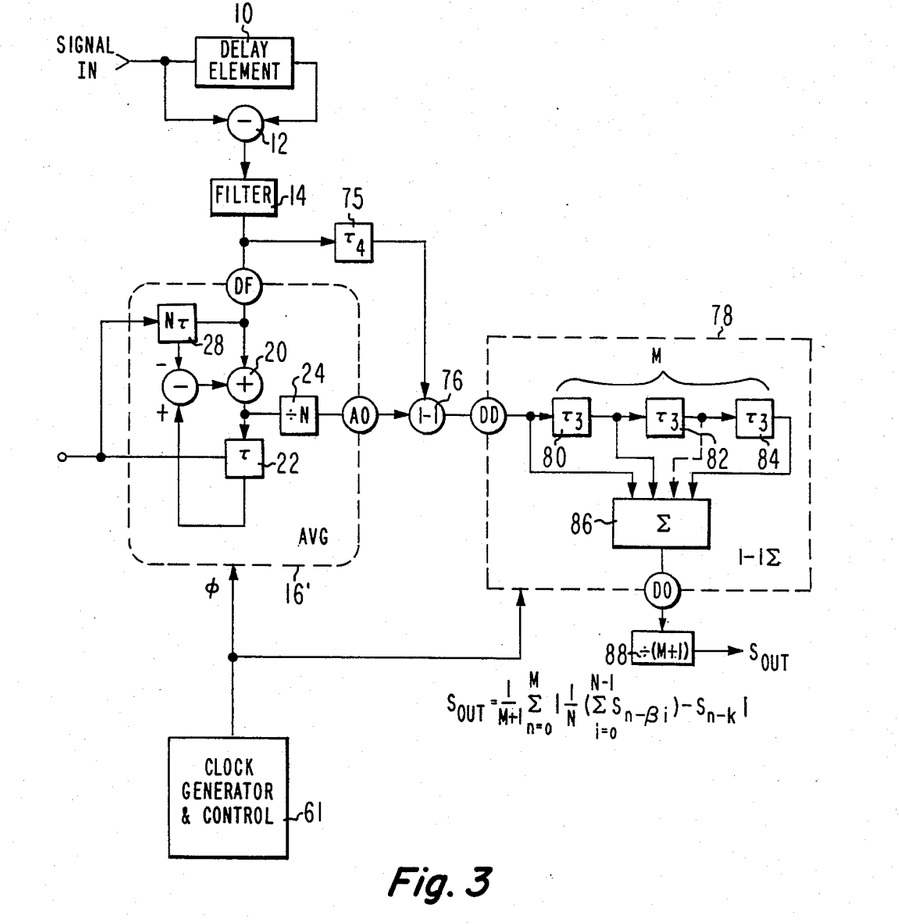

FIG. 3 illustrates another embodiment of noise estimation circuitry. In this embodiment the average of a number of samples is determined and the value of the magnitude of the difference between the average and one difference sample contributing to the average is developed. A number (M+1) of these magnitude values are averaged to produce the noise estimate.

In FIG. 3, the difference samples from filter 14 are applied to the averaging circuit 16' which corresponds to averaging circuit 16 in FIG. 1. The difference sample averages produced by averager 16' are coupled to the differencing circuit 76. Difference samples from filter 14 are coupled to a second input connection of differencing circuit 76 via delay element 75. Differencing circuit 76 produces the magnitude value of the difference between the difference sample average and the particular difference sample applied to its respective input connections.

Delay element 75 provides an appropriate delay such that the difference sample subtracted from the average corresponds to a difference sample which occurs (in time) near the center of the sequence of difference samples contributing to the average.

The magnitude value samples produced by differencing circuit 76 are coupled to the magnitude value summing circuit 78. In circuit 78 the magnitude value samples are coupled to a cascade connection of delay elements 80-84, each of which delays the magnitude value samples by an integral number of sample periods. The magnitude value samples and the delayed magnitude value samples from the respective delay elements 80–84 are coupled to the sample combining element 86. Sample combining element 86 forms the sums of the magnitude value samples and the delayed magnitude value samples. These sums are coupled to a divider 88 which divides the sums to produce an average difference magnitude value corresponding to the noise estimate. The noise estimate, $S_{out}$, developed by the FIG. 3 circuitry may be expressed by the equation $$S_{out} = \frac{1}{M+1} \sum_{n=0}^{M} \left| \frac{1}{N} \left( \sum_{i=0}^{N-1} S_{n-\beta i} \right) - S_{n-k} \right|$$

where the value k in the index (n-k) corresponds to the number of sample delay periods provided by delay element 75.

Figure 4:
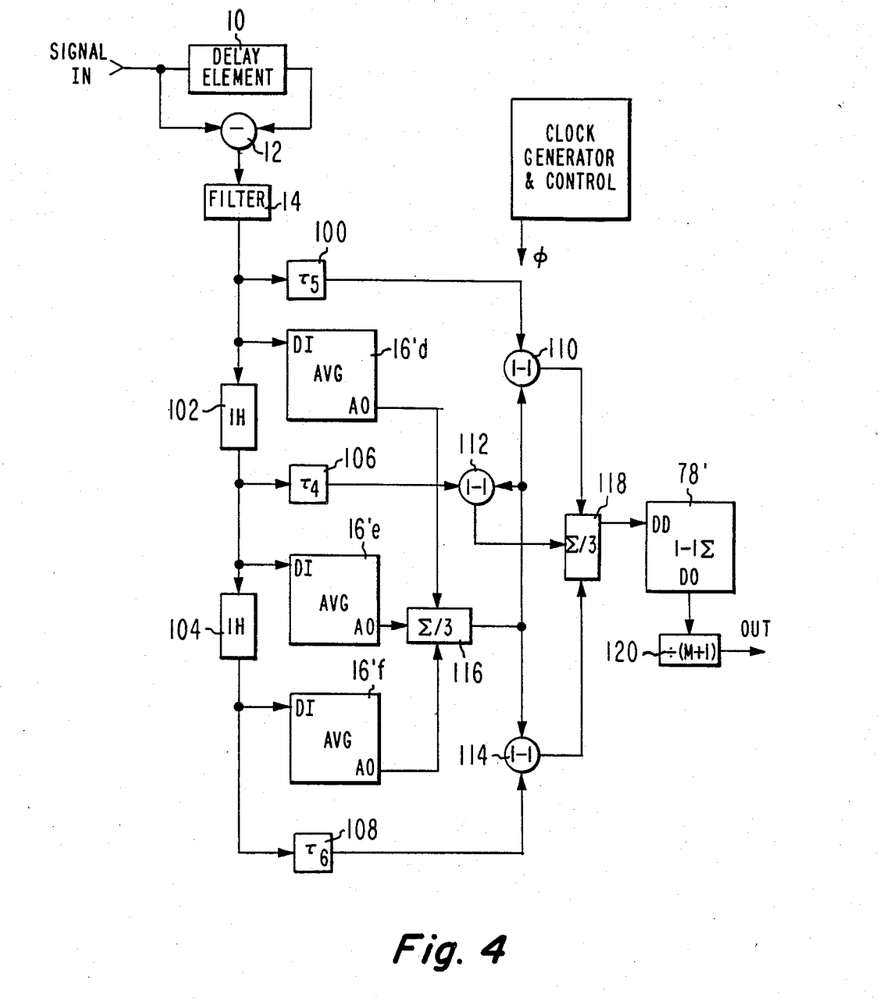

The FIG. 3 apparatus develops noise estimates from a one dimensional array of difference samples. The system may be expanded to form noise estimates from a two dimensional array of difference samples as shown in FIG. 4. In FIG. 4 elements 16'd, 16'e and 16'f correspond to the averaging circuit 16 in FIG. 1, and element 78' corresponds to the magnitude value summing circuit 78 in FIG. 3.

Difference samples from filter 14 are coupled to the cascade connection of two one-horizontal-line delay elements 102 and 104. The difference samples and the delayed difference samples from delay elements 102 and 104 are applied to averaging circuits 16'd, 16'e and 16'f respectively which develop averages from portions of three lines of difference samples. These averages are summed and averaged in circuit element 116 to develop a spatial difference sample average. The spatial average is coupled to respective first input connections of differencing circuits 110, 112 and 114. Difference samples from filter 14 are coupled to a second input connection of differencing circuit 110 via delay element 100. Delayed difference samples from delay elements 102 and 104 are coupled to second input connections of differencing circuits 112 and 114 via delay elements 106 and 108 respectively. Differencing circuits 110, 112 and 114 produce the magnitude values of the difference between the spatial average and difference samples from each of three horizontal lines. The magnitude values from circuits 110, 112 and 114 are applied to circuit 118 which produces the average of the three magnitude values. These average magnitude values correspond to vertical averages and are coupled to the magnitude value summing circuit 78' which forms the sums of M+1 sequential vertical average samples. These sums are divided by (M+1) in divider 120 to produce a spatial average of difference magnitude values corresponding to the noise estimate.

The delay elements 100, 106 and 108 are selected such that the difference samples from the respective lines that are subtracted from the spatial average, correspond to difference samples occurring near the center of the sequences of difference samples from the respective lines that contribute to the spatial average. The sample delay periods provided by delay elements 100, 106 and 108 may be similar such that the difference magnitudes developed by elements 110, 112 and 114 are vertically aligned. Alternatively, the delay elements 100, 106 and 108 may provide different periods of delay so that the difference magnitudes are developed from e.g. vertically skewed image points.

Figure 5:
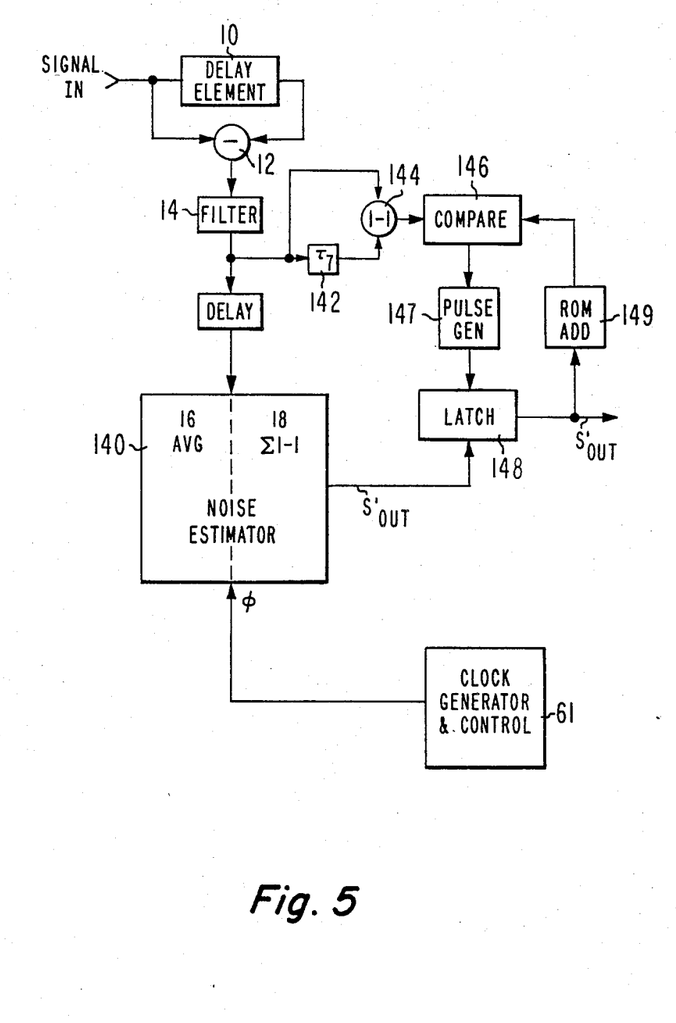
FIG. 5 is a block diagram of noise estimating circuitry with provision for reducing adverse effects of nonrepetitive signal occurrences.

FIG. 5 illustrates a noise estimation system which is substantially insensitive to transitions of signal change e.g., motion contributions to the difference samples. The illustrative system applies to noise estimates taken from a one dimensional array of sample differences, and is easily expandable to two dimensional systems.

The difference samples from filter 14 are coupled to a noise estimator 140 which corresponds to the combined elements 16, 18 and 62 of FIG. 1 or elements 16', 75, 76, 78 and 88 of FIG. 3. The difference samples from filter 14 are also coupled to a delay element 142 and one input connection of differencing circuit 144. Delayed difference samples from delay element 142 are coupled to a second input connection of differencing circuit 144. Delay element 142 provides a delay of one or a small integral number of sample periods. The output produced by differencing circuit 144 corresponds to the magnitude of change of closely spaced difference samples. The magnitudes of change are compared to a threshold value in comparator 146 which produces a pulse output signal if the change exceeds the threshold value. The output connection of the comparator 146 is coupled to a pulse generator 147 which may be a one-shot monostable or a counting circuit. Pulse generator 147, responsive to output pulses from the comparator, develops an output pulse of duration equal to Nτ sample periods which duration is equal to the time that the detected motion transition courses through the averaging circuit 16. The pulses provided by generator 147 are coupled to the control input connection of latch 148. Latch 148 may be of the type designated 74S373 and sold by Texas Instruments Inc., Dallas, Texas. Noise estimates provided by estimator 140 are coupled to the data input connections of latch 148. In the absence of pulses generated by pulse generator 147 the noise estimates $S_{out}$ are continuously passed from the estimator 140 to the output connection $S'_{out}$ by latch 148. However, when a difference sample transition is detected by comparator 146, pulse generator 147 develops a pulse which conditions latch 148 to store the noise estimate which preceded the transition and to output this estimate for the duration of the period of the pulse.

The threshold values against which the comparator 146 compares difference sample changes are provided by ROM 149. The threshold value may be a fixed constant greater than the average noise estimate expected. Alternatively the threshold values may be made variable as a function of the noise estimates. In this instance the noise estimates, $S'_{out}$, are coupled to the address input connection of ROM 149. ROM 149 is programmed to provide threshold values corresponding to ranges of noise estimates applied as address codes. For each range of noise estimates, the threshold value will be selected to exceed the range by a small amount, e.g. 8 IRE for video signals.

What is claimed is:
1. A noise estimating circuit comprising:
an input terminal for applying an input signal;
means, coupled to said input terminal, for producing difference samples corresponding to differences between substantially redundant intervals of said input signal;
averaging means, coupled to said means for producing difference samples, for generating an average of a predetermined number of said difference samples;

means, coupled to said means for producing difference samples and to said averaging means, for generating magnitude values of differences between said average and ones of said difference samples contributing to said average; and means, coupled to said means for generating magnitude values, for producing a noise estimate signal corresponding to an average of a predetermined number of said magnitude values.

2. The noise estimating circuit set forth in claim 1 wherein said input signal consists of a video signal structured in frame, field and line image intervals of information, and said means for producing difference samples comprises:

delay means coupled to said input terminal for providing said input signal delayed by an image interval; and means, coupled to said input terminal and said delay means, for producing said difference samples corresponding to differences between said input signal and said delayed input signal.

3. The noise estimator set forth in claim 1 wherein said averaging means comprises:

means, coupled to said means for producing difference samples, for generating sums of N successive difference samples, where N is a predetermined integer; and divider means, coupled to said means for generating sums, for dividing said sums by the integer N.

4. The noise estimator set forth in claim 1 wherein said means for generating magnitude values comprises:

means, coupled to said means for producing difference samples, having a plurality of output connections for providing a plurality of delayed difference samples respectively delayed by different integral numbers of sample periods;

a plurality of subtracter circuits having respective first input connections coupled to said averaging means, and having respective second input connections respectively coupled to ones of said plurality of output connections, each of said subtracting circuits providing at respective output connections thereof, magnitude values of differences between said average and respective ones of said delayed difference sample.

5. The noise estimator set forth in claim 4 wherein the means for producing a noise estimate signal comprises:

signal combining means having input connections respectively coupled to the output connections of said plurality of subtracter circuits, for producing sums of the magnitude values produced by said subtracter circuits; and dividing means, coupled to said signal combining means, for dividing said sums by a value corresponding in number to said plurality of subtracters.

6. The noise estimator set forth in claim 1 wherein said means for generating magnitude values comprises:

delay means, coupled to said means for producing difference samples, for providing a delayed replica of one of said difference samples;

subtracter circuitry, coupled to said averaging means and said delay means, for producing a magnitude value of the difference between said average and said delayed replica.

7. The noise estimator set forth in claim 6 wherein the means for producing a noise estimate signal comprises:

further delay means, coupled to said subtracter circuitry, for providing a plurality of said magnitude values relatively delayed with respect to each other;

means coupled to said further delay means for summing said plurality of magnitude values to produce a sum signal; and divider means, coupled to said means for summing, for scaling said sum by a number corresponding to the number of magnitude values contributing to said sum signal.

8. The noise estimator set forth in claim 1 wherein said input signal is a video signal and said difference samples contributing to said noise estimate signal are selected from a one dimensional array of said difference samples.

9. The noise estimator set forth in claim 1 wherein said input signal is a video signal and said difference samples contributing to said noise estimate signal are selected from a two dimensional array of said difference samples.

* * * * *